United States Patent [19]
Tojima et al.

[11] Patent Number: 5,058,718
[45] Date of Patent: Oct. 22, 1991

[54] CLUTCH FACING ABRASION INDICATOR

[75] Inventors: Hiromi Tojima; Masaaki Asada, both of Neyagawa, Japan

[73] Assignee: Kabushiki Kaisha Daikin Seisakusho, Nevagawa, Japan

[21] Appl. No.: 521,484

[22] Filed: May 10, 1990

[30] Foreign Application Priority Data

May 12, 1989 [JP] Japan ................................ 1-54909[U]

[51] Int. Cl.⁵ ........................ B60Q 1/00; F16D 13/58
[52] U.S. Cl. ................................ 192/30 W; 340/454
[58] Field of Search .................... 192/30 W; 188/1.11; 340/454

[56] References Cited

U.S. PATENT DOCUMENTS

| | | | |
|---|---|---|---|
| 3,339,676 | 9/1967 | Quinn | 340/454 X |
| 3,469,666 | 9/1969 | Goode | 340/454 X |
| 3,982,614 | 9/1976 | Bisaillon | 192/30 W |
| 4,474,274 | 10/1984 | Lutz et al. | 192/30 W |
| 4,664,239 | 5/1987 | Symes et al. | 192/30 W X |
| 4,705,151 | 11/1987 | Leigh-Monstevens et al. | 192/30 W X |

FOREIGN PATENT DOCUMENTS

| | | | |
|---|---|---|---|
| 0006432 | 1/1986 | Japan | 192/30 W |
| 0244926 | 10/1986 | Japan | 192/30 W |
| 0244927 | 10/1986 | Japan | 192/30 W |

*Primary Examiner*—Rodney H. Bonck
*Attorney, Agent, or Firm*—Armstrong, Nikaido, Marmelstein, Kubovcik & Murray

[57] ABSTRACT

A pressure plate for pressing the friction facing of a clutch disc to the flywheel is connected to an operating part through a mechanical link mechanism. A part to be detected which moves by the extent corresponding to the shift of the pressure plate in the clutch axial direction is disposed in the link mechanism. A contact-free sensor for detecting the part to be detected is disposed in the stationary part of the clutch, and when the clutch is connected with the abrasing facing worn to a specific limit, the sensor is designed to detect the part to be detected. There is a control part for receiving the detection signal from the sensor, and a display part is provided to tell that the control part has received the detection signal.

3 Claims, 1 Drawing Sheet

CLUTCH FACING ABRASION INDICATOR

BACKGROUND OF THE INVENTION

1. Field of the Invention

The present invention relates to a device for indicating the wear limit of a friction facing of a friction clutch used in automobiles.

2. Description of the Prior Art

In an automotive friction clutch, generally, in order to maintain its specified performance, it is required to replace the friction facing when it is worn to the limit. Hitherto, when the friction facing wear reached the limit, it was detected through the driver by feeling the slip in the clutch, or through the serviceman by checking the adjusting allowance of the release fork or the like included in the clutch operating mechanism on the occasion of periodic checking or the like.

In the conventional structure, thus, it was impossible to detect accurately and easily the wear of the friction facing reaching its limit.

It is hence a primary object of the invention to present a device solving such problems.

SUMMARY OF THE INVENTION

To achieve the above object, in the invention, the pressure plate for pressing the friction facing of the clutch disc to the flywheel is coupled to the operating part through the mechanical link mechanism, the part to be detected for moving by the extent corresponding to the shift in the clutch axial direction of the pressure plate is disposed in the link mechanism, a contact-free sensor for detecting the part to be detected is disposed on the stationary part of the clutch to compose so that the part to be detected is detected by the sensor when the friction facing contacts with the clutch in a state being worn to a specified limit amount, a control part is provided in order to receive the detection signal of the sensor, and a display part is disposed to indicate that the control part has received the detection signal.

According to this structure, when the wear of the facing has reached the limit, the positions of the pressure plate and link mechanism in the clutch engaged state move outside the ordinary range correspondingly, and the part to be detected reaching such position is detected by the sensor, so that the display part is operated by the control part.

DESCRIPTION OF THE PREFERRED EMBODIMENTS

Figure 1:
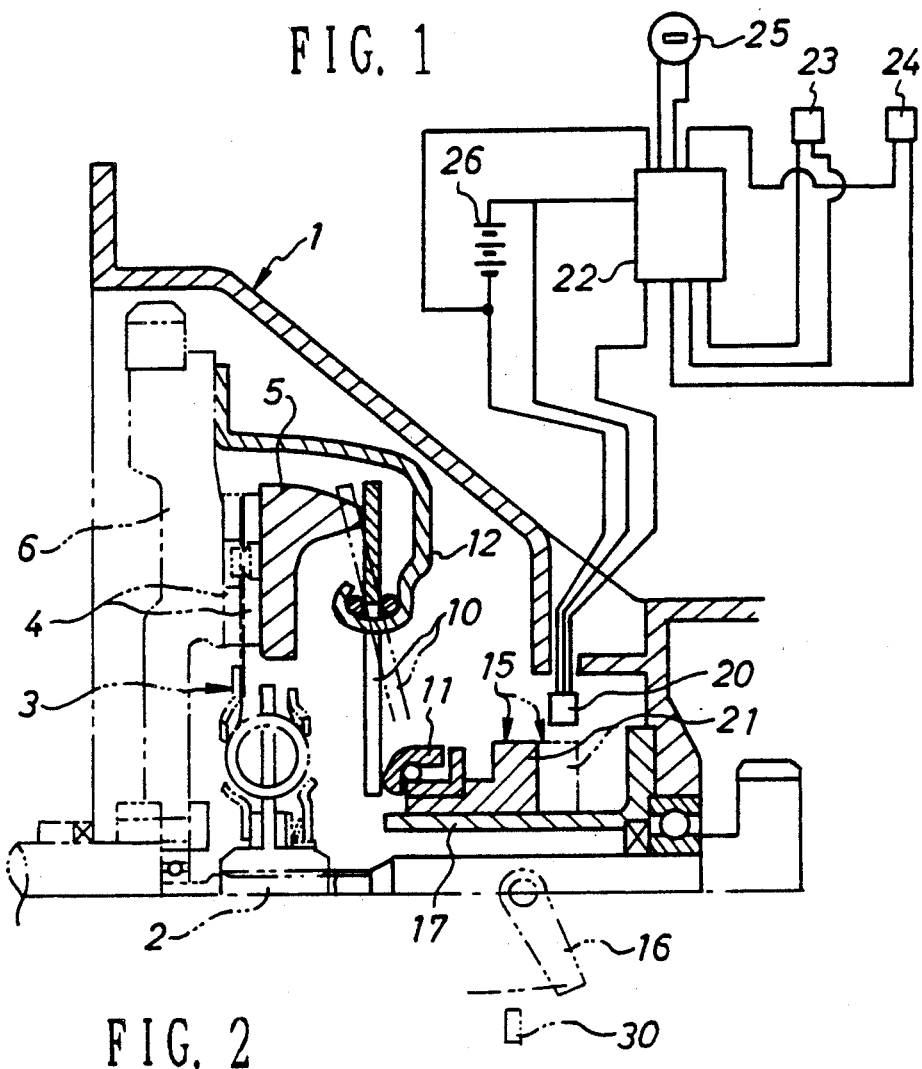
FIG. 1 is a sectional view of an embodiment of the invention
Figure 2:
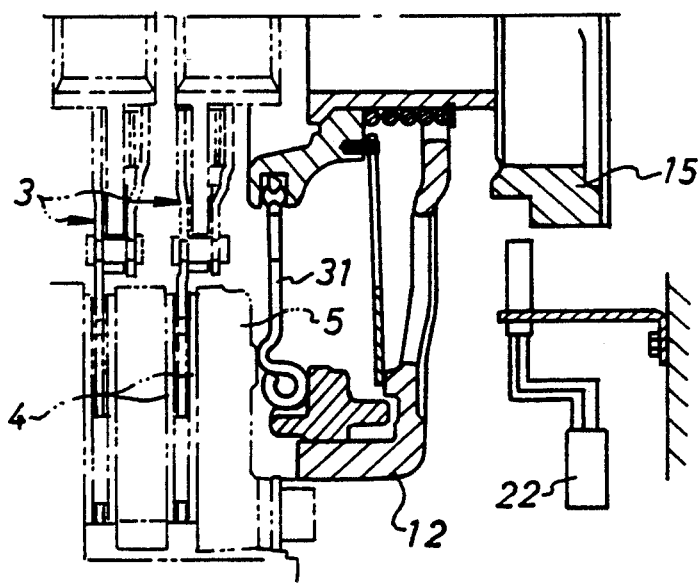
FIG. 2 is a partial sectional view of a different embodiment.

Inside a housing 1, a clutch disc 3 is connected to an input shaft 2, and the clutch is engaged by pressing a friction facing 4 disposed in the clutch disc 3 against a flywheel 6 by means of a pressure plate 5. The clutch is disengaged by releasing the pressing force from the pressure plate 5 to the friction facing.

To realize such an operation, on the back side of the pressure plate 5, the outer circumference of the diaphragm spring 10 is coupled. The diaphragm spring 10 has its inner circumference coupled to a release bearing 11, and has its middle part in the radial direction supported by a clutch cover 12 through a wire ring. The release bearing 11 is coupled with a shift block 15 (sleeve) for composing part of the link mechanism. The shift block 15 is manipulated by a release fork 16 extending to the outside of the housing 1. The release fork 16 is coupled with a clutch pedal, actuator or other operating part not shown in the drawing, through the link mechanism or lever mechanism.

The release bearing 11 and shift block 15 are mutually coupled so as to be arranged in the axial direction. The shift block 15 is supported in the axial direction so as to be able to oscillate on the outer circumference of the sleeve 17 fixed on the housing 1, on the periphery of the input shaft 2. In the clutch disengaging operation, the shift block 15 is pressed towards the clutch disc 3 by the clutch pedal or actuator through the release fork 16, and accordingly the release bearing 11 pushes the inner circumference of the diaphragm spring 10 in the same direction, thereby forcing the entire diaphragm spring 10 to be deformed. In the clutch connecting action, the force applied from the clutch pedal or the like to the release fork 16 is released or notably decreased, and hence the force applied from the shift block 15 to the diaphragm spring 10 through the release bearing 11 is also released or decreased significantly. As a result, only by its own elasticity, the diaphragm spring 10 presses the pressure plate 5 against the flywheel 6. This structure, so far, is known.

In the clutch connected state, the inner circumference of the diaphragm spring 10 is moved backward of the position of the clutch disengaged state, that is, in the direction departing from the clutch disc 3. When the friction facing 4 is worn, the position of the pressure plate 5 in the clutch connected state is shifted to the flywheel 6 side, and hence the diaphragm spring 10 is inclined more as indicated by the double dot chain line, as compared with the initial state indicated by solid line in the drawing, so that the inner circumference of the diaphragm spring 10 moves backward. In consequence, the position of the shift block 15 in the clutch connected state is also moved backward as indicated by double dot chain line, as compared with the initial position while the facing is not worn as indicated by solid line. Incidentally, the positions of the diaphragm spring 10 and shift block 15 indicated by the double dots chain lines are expressed with an emphasis for the convenience of explanation.

Thus, the position of the shift block 15 in the clutch connected state as the friction facing 4 is worn to the limit is changed backward as compared with the state before wear of the facing. In order to detect the position of the shift block 15 in the wear limit state, a sensor 20 is built in the housing 1. The sensor is of a contact-free type, that is, it is composed of proximity switch, and the rear end peripheral part (the part to be detected 21) is detected, without making contact therewith, only when the part to be detected 21 reaches the upper limit position indicated by double dots chain line.

As known from the explanation herein, it is only when the friction facing 4 reaches the limit that the sensor 20 detects the part to be detected 21.

The sensor electrically connects with a control part 22 disposed outside the housing 1. In the control part 22, the display unit, alarm lamp 23 and pilot lamp 24 are connected. The alarm lamp 23 and pilot lamp 24 are installed at positions visible to the driver. Furthermore, in the illustrated embodiment, an ignition key 25 of an automobile is also connected to the control part 22.

These devices are composed so as to operate as follows by receiving electric power from a power supply unit 26.

While the ignition switch 25 is in a shut-off state, electric power is not supplied to the control part 22, sensor 20 and alarm lamp 23 and pilot lamp 24. When the ignition key 25 is connected, the control part 22 and related parts are set into an active state. While the sensor 20 is not detecting the part to be detected 21, that is, while the friction facing 4 is not worn to the limit or the clutch is disengaged, the control part 22 lights up only the pilot lamp 24. Therefore, the driver see that the friction facing 4 is not worn to the limit only by visually recognizing the lighting of the pilot lamp 24.

When the clutch is engaged with the friction facing 4 worn to the limit, the sensor 20 detects the part to be detected 21, and sends a signal to the control part 22, which puts out the pilot lamp 24 and lights or flickers the alarm lamp 23. The driver, by visually recognizing the lighting or flickering of the alarm lamp 23, knows that the friction facing 4 is worn to the limit.

Thus, according to the invention, by detecting a part of the link mechanism coupled to the pressure plate 5 by the sensor 20 and displaying the detection state to the driver, the driver knows accurately and adequately that the friction facing 4 is worn to the limit, so that the friction facing 4 may be replaced before slipping occurs. Of course, it is not necessary to check the release fork 16 or other parts located at hard-to-see positions, in order to check the extent of wear.

Alternative indicator other than the lamp 23, such as a buzzer or the like, may be also used.

The position of the sensor 20 may also be changed. For example, as shown in FIG. 1, a sensor 30 may be positioned with the release fork 16 to detect and measure its movements.

According to the structure in FIG. 1, the outer circumference of the diaphragm spring 10 (release lever) is coupled to the pressure plate 5, and the middle part in the radial direction is supported by the clutch cover 12. In the clutch disengaging action, therefore, the release bearing 11 presses the inner circumference of the diaphragm spring 10. Alternatively, in another method, the release lever 31 at one end may be supported along the outer radial edge of the clutch cover 12, and at the other end connected to the pressure plate 5 towards the inner radial section of the clutch cover 12. In other words, the invention may be also applied to a clutch designed to be disengaged by pulling the inner circumference of the release lever 31 in the direction aways from the clutch disc 3.

What is claimed is:

1. A clutch facing abrasion indicator for a clutch system having a clutch disc with a friction facing, a flywheel and a pressure plate for pressing the friction facing against the flywheel, the clutch facing abrasion indicator comprising:
   a detection element operatively connected to the pressure plate such that movement of the pressure plate generates a corresponding, predetermined movement in said detection element, the predetermined movement of said detection element being related to an amount of wear on the friction facing of the clutch disc;
   a contact-free sensor stationarily mounted within the clutch system for measuring the predetermined movement of said detection element and for generating a signal corresponding to the amount of wear on the friction facing;
   signal control means for receiving the signal for the contact-free sensor and for generating an output signal to signal at least one of a condition of the friction facing still being able to operate and a condition of the friction facing no longer being able to operate; and
   display means for receiving the output signal of said signal control means and for displaying the condition of the friction facing, said display means including a pilot lamp for indicating the active operation of said signal control means and said contact-free sensor, and
   an alarm lamp for indicating the condition of the friction facing, said pilot lamp and said alarm lamp being operatively connected such that said pilot lamp is in an OFF state when said alarm lamp is in an ON state.

2. A facing abrasion indicator as set forth in claim 1 further comprising:
   activating means operatively connected to said contact-free sensor, said signal control means and said display means for activating the operation of said contact-free sensor, said signal control means and said display means only when an ignition switch of a vehicle with the clutch facing abrasion indicator is engaged.

3. A facing abrasion indicator as set forth in claim 1, wherein said detection element further comprises:
   a shift block operatively connected to a diaphragm spring through a release bearing in the clutch system such that movement of the pressure plate moves the diaphragm spring and correspondingly the release bearing such that the release bearing moves the shift block in a predetermined movement related to the amount of wear on the friction facing of the clutch disk.

* * * * *

UNITED STATES PATENT AND TRADEMARK OFFICE
CERTIFICATE OF CORRECTION

PATENT NO. : 5,058,718

DATED : October 22, 1991

INVENTOR(S) : Hiromi TOJIMA et al

It is certified that error appears in the above-identified patent and that said Letters Patent is hereby corrected as shown below:

On the cover page, Item [73], "Kabushiki Kaisha Daikin Seisakusho, Nevagawa, Japan" should read "Kabushiki Kaisha Daikin Seisakusho, Neyagawa, Japan".

Signed and Sealed this

Twenty-fifth Day of February, 1992

Attest:

HARRY F. MANBECK, JR.

*Attesting Officer*     *Commissioner of Patents and Trademarks*